Jan. 10, 1967　　　　M. E. McMAHON　　　　3,297,568
METHOD AND APPARATUS FOR PURIFYING INDUSTRIAL WASTE
WATERS CONTAINING OIL AND SOLIDS
Filed Nov. 25, 1964
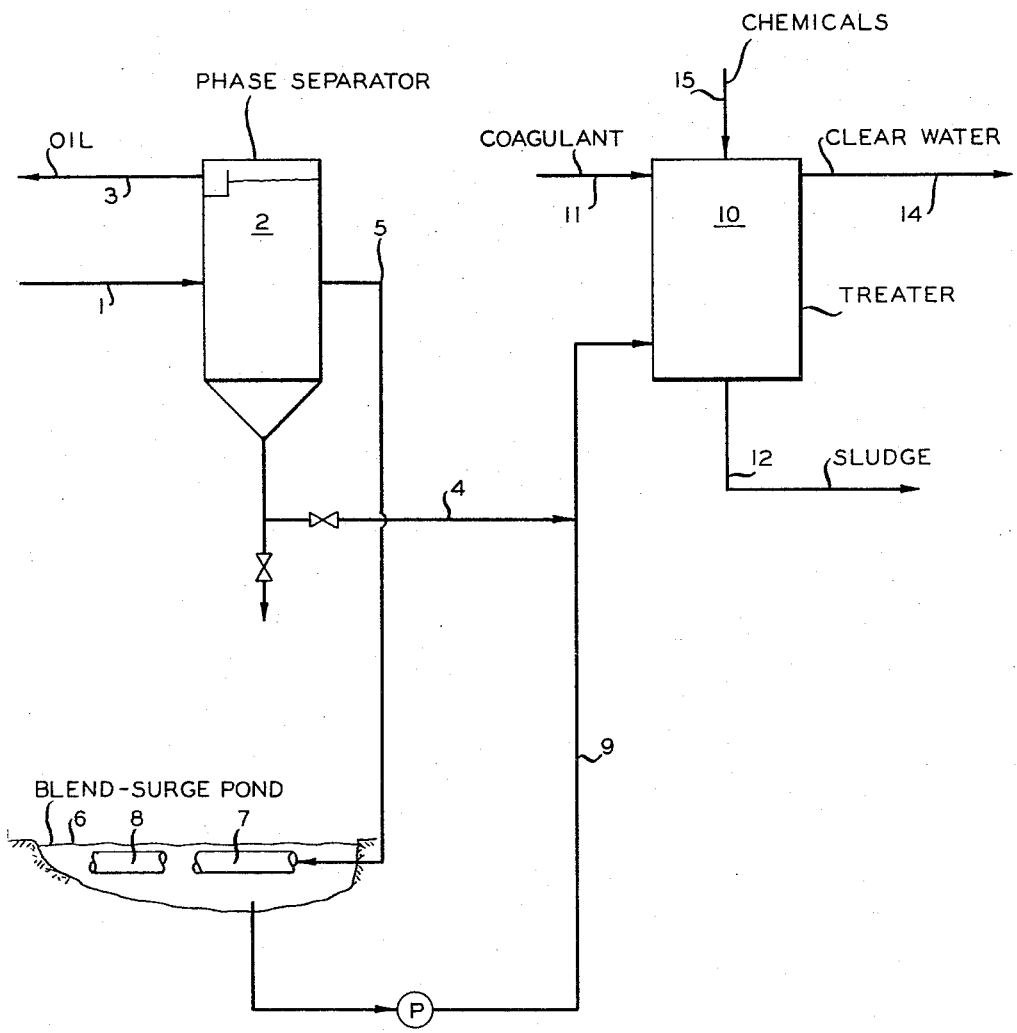
*INVENTOR*
M. E. McMAHON
BY
*ATTORNEYS*

United States Patent Office 3,297,568
Patented Jan. 10, 1967

---

3,297,568
METHOD AND APPARATUS FOR PURIFYING INDUSTRIAL WASTE WATERS CONTAINING OIL AND SOLIDS
Martin E. McMahon, New Delhi, India, assignor to Phillips Petroleum Company, a corporation of Delaware
Filed Nov. 25, 1964, Ser. No. 413,816
5 Claims. (Cl. 210—51)

This invention relates to water purification. In one of its aspects it relates to a method of purifying industrial waste comprising roughly separating industrial waste into a water phase and a solids phase, passing the water phase to a surge pond and therein homogenizing the water phase with water in the surge pond, passing a portion of homogenized water from the surge zone and admixing the same with the solids phase, and separating water from solids and other impurities. In a more specific aspect an eductor tube is used in the surge zone to homogenize the water therein. In another of its aspects, the invention relates to an apparatus for separating industrial waste comprising a phase separator, a surge pond for blending large quantities of water, and a treater for producing purified water from an industrial waste feed.

Industrial waste such as liquids from sludge pits, slop water from refineries can be purified for reuse in operations such as water flooding for secondary recovery of oil or can be discharged into streams. The wastes from different sources vary in mineral content as well as in impurities content for that reason are difficult to treat in a continuous process. Impure water, from different sources and free from solids varying in mineral composition, must have different amounts of chemicals and even different chemicals added to it for purification purposes. If the industrial wastes are homogenized in a large pond or surge vessel before treating, solids and sludge will settle to the bottom and reduce the volume of the surge pond. It has now been discovered that if the solids are crudely separated from the liquids, the liquids homogenized and the liquids admixed with the solids for coagulation purposes, a more uniform mineral content water can be produced.

It is an object of this invention to provide a process for purification of industrial wastes.

It is a further object of this invention to provide a process for homogenizing solids-free water from a plurality of sources.

It is a still further object of this invention to homogenize water from various industrial waste sources without harmful accummulation of solids in the homogenizing zone.

It is a still further object of this invention to provide an apparatus for carrying out the process of the invention.

Other aspects, objects and the several advantages of this invention are apparent from a study of the disclosure, the drawing, and the appended claims.

According to the invention, industrial wastes from various sources containing, for example, water and oil impurities, and solid impurities, are crudely separated to give an oil phase, a water phase, and a solids phase. The water phase is passed to a surge pond which contains large quantities of water from various sources and the water phase is blended with the water in the surge pond to produce a substantially homogeneous water phase. A portion of the water phase is taken from the pond and admixed with the solids phase and the mixture is passed to a treater wherein substantially pure water is produced. In a more specific aspect, the water phase is passed into an eductor tube which is located in the surge pond to aid in homogenizing the water in the pond. Further, the mixture of the solids phase and the homogeneous water phase is treated with a coagulant and chemical treatment agents to produce the substantially pure water.

The invention can be better understood by referring to the drawing which shows a schematic of the operation.

Referring now to the drawing, industrial wastes pass into phase separator 2 through line 1 and therein are separated into a liquid phase; an oil phase, which separates as a supernatant liquid on the liquid phase and is removed through line 3; and a solid phase. The solid phase is removed from the phase separator 2 through line 4. The liquid phase, consisting substantially of water, fine solids, and dissolved minerals, is passed from phase separator 2 through line 5 and into surge pond 6. The surge pond 6 is a large vessel or pond which can hold large quantities of water. For example, a surge pond useful in the invention could have a capacity of 120,000 bbls. of water. The water phase passes into surge pond 6 through eductor tube 7 which is larger than line 5 and is open to liquid in the surge pond at the point where line 5 enters tube 7. The water phase passing through line 5 into eductor tube 7 will draw water from the surge pond 6 and admix the water with the water phase from line 5. The water phase passes through tube 7 into conduit 8 wherein further mixing and homogenization takes place. Conduit 8 can be provided with a series of holes for allowing the water phase from line 5 and tube 7 to admix with the water in the surge pond 6. Surge pond 6 can be placed on a geographically lower level than phase separator 2 so that the water phase from separator 2 will flow by gravity into the surge pond under pressure to aid in the mixing and blending of the liquids. Alternatively, a pump can be provided in line 5 to supply the requisite pressure to the water phase passing through line 5. Surge pond 6 serves as an area wherein water phase from different industrial wastes can be blended to provide a water phase with a substantially homogeneous mineral content. Substantially homogeneous water phase is passed from surge pond 6 through line 9 and admixed with the solids phase passing through line 4. The solids aid in precipitating finely divided entrained solids. The mixture is passed into treater 10 wherein the substantially complete separation takes place. The solids from line 4 act as a weighing agent and help precipitate solids in line 9. Coagulant to help in precipitation of the solids can be added through line 11. Any standard coagulant used to precipitate industrial solid impurities in water can be used. Further, chemical treating agents can be added through line 15 to remove mineral impurities from the water. When the mineral content of the water entering the treater remains substantially constant, a constant amount of chemical treating agent can be added through line 15. Treater 10 can consist of a single treater or a series of treaters which cooperate to produce substantially clear water which is removed through line 14 and a sludge phase which is removed through line 12.

SPECIFIC EXAMPLE

| Item Component | (1) | (3) | (4) | (5) and (9) | (11) | (12) | (14) |
|---|---|---|---|---|---|---|---|
| Material | Waste Water | Slop Oil | Sludge | Water | Compound [1] | Sludge | Water |
| Bbl./day | [2] 120,000 | | | 120,000 | | | 120,000 |
| Gallons/Month | | 1,000 | | | | | |
| Tons/Day | | | 3 | | | 3¾ | |
| Lbs./Day | | | | | 30 | | |

[1] Nalcolyte 670 flocculent sold by Nalco Chemical Company, 6216 W. 66th Place, Chicago, Illinois. Nalcolyte 670 is a polyacrylamide having a molecular weight greater than 1 million, a density of 43 lbs./cu. ft., decomposition point of 258° C., water soluble non-ionic polymer with a pH of 1 percent solution of 7.0.

[2] Not including oil and "sludge."

| Condition | Vessel | | |
|---|---|---|---|
| | 2 | 6 | 10 |
| Temperature | Ambient | Ambient | Ambient. |
| Pressure | Atmospheric | Atmospheric | Atmospheric. |
| Size: | | | |
| Height, ft | 10 | | 16. |
| Diam., ft | 65 | | 85. |
| Barrels | | 120,000 | |

Reasonable variation and modification are possible within the scope of the foregoing disclosure, the drawing and the claims to the invention, the essence of which is that industrial wastes are purified for reuse by crudely separating solids from liquids, passing the liquids to a homogenation zone wherein the liquids are mixed with other liquids, admixing a portion of the homogenized liquids with the separated solids and treating the mixture to remove the impurities from the liquids.

I claim:

1. A method for purifying industrial waste waters containing oil and solids comprising passing said waste waters to a separator, separating a liquid phase from a solid phase, passing said liquid phase to a surge zone which contains a large quantity of impure liquid, blending said impure liquid in said surge zone with said liquid phase to produce a substantially homogeneous mixture of liquids, removing a portion of said homogenized liquid from said surge zone and admixing the same with said solids phase, passing said mixture to a separation and treating zone, and separating a substantially pure liquids phase from a solids phase.

2. A method according to claim 1 wherein treating in said treating zone comprises adding a coagulant to said treating zone for precipitating solid material, and adding chemical treating agent to said treating zone to treat said water phase.

3. A method according to claim 1 wherein said blending of said liquid phase with said impure liquid in said surge zone comprises passing said liquid phase under pressure through an eductor tube positioned in said surge zone and adapted to draw said impure liquid into said eductor tube as said liquid phase passes therethrough.

4. An apparatus for purifying industrial wastes comprising a means for separating industrial waste into a liquids phase, a solids-containing phase and an oil phase, means for removing said liquid phase from said separator, a surge pond, means for passing said liquid phase to said surge pond, means for mixing said liquid phase from said separator with liquid in said surge pond to substantially homogenize the liquid in said surge pond, means for passing a portion of homogenized liquid from said surge pond, means for passing said solids phase from said means for separating said industrial wastes, means for mixing said solids phase from said separator with said portion of homogenized liquid, means for passing said mixture of solids phase and homogenized liquids phase to a means for treating said mixture to substantially separate liquid from solids.

5. An apparatus for purifying industrial waste containing oil, water and solids comprising a liquid separator for separating said industrial waste into an oil phase, a water phase, and a solids phase, a surge and equalization pond, an eductor in said surge and equalization pond for homogenizing incoming water with water in said pond, means for passing said water phase from said separator through said eductor into said surge and equalization pond, means for removing a portion of homogenized water from said surge pond, means for admixing said solids phase with said homogenized water phase, means for passing a mixture of solids phase and homogenized water phase to a liquid solid separator, and a liquid solids separator which separates said mixture into a substantially pure water phase free from solids, and a solids phase.

References Cited by the Examiner

Brady, S.O.: Effluent Improvement Program at Humble's Baytown Refinery, Proc. Ninth Ind. Waste Conf., Purdue Univ., 1954, pp. 98–106.

MORRIS O. WOLK, *Primary Examiner.*

MICHAEL E. ROGERS, *Assistant Examiner.*